Patented Dec. 29, 1953

2,664,396

UNITED STATES PATENT OFFICE 2,664,396

ION EXCHANGE TREATMENT OF SOLUTIONS CONTAINING CYANOHYDRINS

Frank R. Riley, New York, N. Y., assignor to American Cyanamid Company, New York, N. Y., a corporation of Maine No Drawing. Application October 31, 1950, Serial No. 193,311

5 Claims. (Cl. 210—24)

This invention relates to the ion exchange treatment of solutions containing aldehyde cyanohydrins and/or ketone cyanohydrins and more particularly to the ion exchange treatment of solutions containing lactonitrile.

According to the present invention I have found that when an aqueous solution containing an aldehyde and/or ketone cyanohydrin is brought into contact with a strongly basic anion exchange resin which contains quaternary ammonium salts and which has been activated with an alkali metal hydroxide, the anion exchange resin performs two functions. It decomposes the cyanohydrin to form the components, aldehyde or ketone and hydrocyanic acid, and then removes the hydrocyanic acid.

My new process is particularly advantageous when applied to the production of acrylonitrile from acetylene and hydrogen cyanide. According to this process, acetylene and hydrogen cyanide are brought into contact with a catalyst such as cuprous chloride in a reactor and the vapors emerging therefrom are passed through a water scrubber. The solution which emerges from the scrubber contains, among other things, acrylonitrile, lactonitrile and hydrocyanic acid. The acrylonitrile is then separated from the solution by distillation, leaving an aqueous residue containing lactonitrile.

The presence of potential hydrogen cyanide or hydrocyanic acid in the waste effluent of any commercial process always presents a serious disposal problem. For instance, in the acrylonitrile process generally outlined above it is not possible to dispose of the waste effluent containing lactonitrile by merely running the solution off into a natural body of water because there is some free hydrocyanic acid present in the solution. By treating this solution, however, according to my process the harmful hydrocyanic acid which is present in the free state and that which is formed by conversion of the lactonitrile is removed whereupon the remainder of the solution may be readily disposed of.

Moreover, it is an advantage of the process of the present invention that the waste disposal problem can be avoided entirely if the effluent from the scrubber is treated directly. In this way the expensive distillation step to separate the desired acrylonitrile from lactonitrile also present in the solution is avoided.

The invention will be described in greater detail in conjunction with the following specific examples which are given for purposes of illustration. It is not intended to limit the scope of the invention to the details of the examples.

Example 1

A bed of anion exchange resin completely activated with a 10% aqueous sodium hydroxide solution and rinsed free of sodium is set up, and an aqueous influent containing approximately 1500 parts per million, as HCN, of lactonitrile is run downflow through the bed at a rate of about 1 gallon per minute per cubic foot. Spot checks are made during the run to determine the total HCN (lactonitrile plus HCN) leakage, and the capacity of the resin is computed to an endpoint of 10 p. p. m., as HCN, total leakage. Check runs are then made after regenerating the resin with 20 lbs. of a 10% solution of sodium hydroxide per cubic foot of resin and rinsing to 0 p. p. m. sodium leakage. The results of the initial and subsequent runs are as follows:

| Run | Regeneration | Average leakage, p. p. m. | Capacity as kg./cu. ft. to 10 p. p. m. total HCN |
|---|---|---|---|
| 1 | Complete activation | Less than 0.1 | 10.5 |
| 2 | 20 lbs. NaOH/cu. ft. | do | 10.8 |
| 3 | 20 lbs. NaOH/cu. ft. | do | 10.8 |

It is noted that the resin turns dark, the color change appearing first at the bottom of the resin column and working its way up through the resin until after two runs the resin is completely dark in color. This color change is apparently due to a reaction between the resin and the acetaldehyde liberated during the run but is accompanied by no loss in capacity or physical failure of the resin.

Example 2

The distillation effluent from an acrylonitrile process which contains a total of 509 p. p. m., as HCN, of HCN (lactonitrile plus HCN) including 54 p. p. m. of free HCN are subjected to the same treatment as described in Example 1 starting with new, completely activated, rinsed resin. The results follow:

| Run | Regeneration | Average leakage, p. p. m. | Capacity as kg./cu. ft. to 10 p. p. m. total HCN |
|---|---|---|---|
| 1 | Complete activation | Less than 0.1 | 11.0 |
| 2 | 20 lbs. NaOH/cu. ft. | do | 9.6 |

Example 3

A completely activated and rinsed bed of resin is set up as in Example 1. An aqueous solution containing from about 2–3% acrylonitrile, and a total of 422 p. p. m., as HCN, of HCN (lactonitrile plus HCN) including 24 p. p. m. of free HCN is run downflow through the bed in accordance with the procedure of Example 1. Throughout the run the leakage of total HCN remains below 0.1 p. p. m. as HCN, and the resin has a capacity to 10 p. p. m. total HCN of 10.2 kilograins per cubic foot of resin.

The anion exchange resin used in Examples 1–3 is one known as "Dowex-2" and believed to be a styrene based copolymer type resin containing quaternary ammonium groups. Similar resins known as "Amberlite IRA 400" and "Amberlite IRA 410" may be substituted as may other strongly basic anion exchange resins containing quaternary ammonium groups such as, for example, the epichlorohydrin-polyalkylene polyamine condensation products of U. S. Patent No. 2,469,683 and application Serial No. 102,949 filed July 2, 1949, etc.

The resins are activated in the usual manner by treatment with a solution of an alkali metal hydroxide such as sodium hydroxide or potassium hydroxide. Since extreme basicity of the resin is necessary for removal of weak hydrocyanic acid, activation with a weaker alkali such as the alkali metal carbonates, i. e., sodium carbonate, potassium carbonate, will generally not be sufficient.

My process is applicable to the ion exchange treatment of any cyanohydrin formed by reaction of an aldehyde or a ketone with hydrogen cyanide. Thus, I contemplate treatment of the cyanohydrins of aliphatic and aromatic aldehydes, of aliphatic ketones and of mixed aliphatic-aromatic ketones such as the cyanohydrins of propionaldehyde, benzaldehyde, acetone, methyl ethyl ketone, methyl vinyl ketone, benzyl methyl ketone, phenyl ethyl ketone, and the like. However, the solutions to which the process of the present invention is particularly applicable, i. e., those produced in the manufacture of acrylonitrile, contain lactonitrile. These solutions generally contain no more than about 0.15% by weight of total HCN which includes free hydrocyanic acid and hydrocyanic acid produced upon decomposition of the lactonitrile. If acrylonitrile is present, it is generally present in small quantities of the order of about 2–3%.

It is an advantage of the present invention that the anion exchanger acts in a dual capacity. It not only removes free hydrocyanic acid present in a given solution but it also decomposes cyanohydrin there present to its components, carbonyl compound and hydrocyanic acid, and then removes the hydrocyanic acid so formed.

I claim:

1. A process which comprises passing an aqueous solution containing a cyanohydrin of the group consisting of aldehyde cyanohydrins and ketone cyanohydrins through, and in contact with, a bed of a strongly basic anion exchange resin containing quaternary ammonium groups, said resin being activated by treatment with an aqueous solution of an alkali metal hydroxide, whereby said cyanohydrin is decomposed to its component parts, carbonyl compound and hydrocyanic acid, and substantially all hydrocyanic acid is removed from said solution.

2. A process which comprises passing an aqueous solution containing lactonitrile through, and in contact with, a bed of a strongly basic anion exchange resin containing quaternary ammonium groups, said resin being activated by treatment with an aqueous solution of an alkali metal hydroxide, whereby said lactonitrile is decomposed to its component parts, acetaldehyde and hydrocyanic acid, and substantially all hydrocyanic acid is removed from said solution.

3. A process according to claim 2 wherein the solution containing lactonitrile also contains some free hydrocyanic acid.

4. A process according to claim 2 wherein the solution containing lactonitrile also contains acrylonitrile.

5. A process according to claim 2 wherein the solution containing lactonitrile contains no more than about 0.15% by weight total HCN, including any hydrocyanic acid present in the free state and any hydrocyanic acid to be derived from the lactonitrile, and about 2–3% acrylonitrile.

FRANK R. RILEY.

References Cited in the file of this patent

UNITED STATES PATENTS

| Number | Name | Date |
|---|---|---|
| 2,228,514 | Griessbach et al. | Jan. 14, 1941 |
| 2,469,693 | Lundberg | May 10, 1949 |
| 2,543,666 | Michael | Feb. 27, 1951 |

FOREIGN PATENTS

| Number | Country | Date |
|---|---|---|
| 592,767 | Great Britain | Sept. 29, 1947 |